(12) United States Patent
Colvin et al.

(10) Patent No.: US 8,476,342 B2
(45) Date of Patent: Jul. 2, 2013

(54) METHOD AND FORMULATION FOR REINFORCING ELASTOMERS

(75) Inventors: Howard A. Colvin, Brandon, FL (US); Jeffery M. Opperman, Findlay, OH (US)

(73) Assignee: Cooper Tire & Rubber Company, Findlay, OH (US)

( * ) Notice: Subject to any disclaimer, the term of this patent is extended or adjusted under 35 U.S.C. 154(b) by 165 days.

(21) Appl. No.: 11/977,390

(22) Filed: Oct. 24, 2007

(65) Prior Publication Data

US 2008/0108733 A1    May 8, 2008

Related U.S. Application Data

(60) Provisional application No. 60/857,445, filed on Nov. 7, 2006.

(51) Int. Cl.
| | |
|---|---|
| C08L 89/00 | (2006.01) |
| C09J 189/00 | (2006.01) |
| C08G 63/48 | (2006.01) |
| C08G 63/91 | (2006.01) |
| A61K 47/48 | (2006.01) |

(52) U.S. Cl.
USPC .......................................... 524/25; 525/54.1

(58) Field of Classification Search
USPC ..................... 524/17, 25; 525/54.1
See application file for complete search history.

(56) References Cited

U.S. PATENT DOCUMENTS

| | | | | |
|---|---|---|---|---|
| 2,033,480 | A | * | 3/1936 | Murphy ........................... 264/86 |
| 2,056,958 | A | | 10/1936 | Coughlin |
| 2,127,298 | A | | 8/1938 | Isaacs |
| 2,203,701 | A | * | 6/1940 | Shepherd ......................... 66/202 |
| 2,605,242 | A | * | 7/1952 | Betts, Jr. et al. ................ 524/17 |
| 2,788,336 | A | * | 4/1957 | Uhing et al. ..................... 524/17 |
| 2,931,845 | A | | 4/1960 | Lehmann et al. |
| 3,002,940 | A | * | 10/1961 | Holloway ..................... 524/517 |
| 3,004,936 | A | * | 10/1961 | Howland et al. ................ 524/25 |
| 3,113,605 | A | | 12/1963 | Fuetterer |
| 4,099,981 | A | | 7/1978 | Mui et al. |
| 4,345,067 | A | | 8/1982 | Wunder |
| 4,374,178 | A | | 2/1983 | Kulkarni et al. |
| 4,474,908 | A | | 10/1984 | Wagner |
| 4,536,568 | A | | 8/1985 | Wunder |
| 5,049,610 | A | | 9/1991 | Takaki et al. |
| 5,374,671 | A | | 12/1994 | Corvasce et al. |
| 5,523,331 | A | * | 6/1996 | Ezoe ............................... 524/25 |
| 5,587,411 | A | * | 12/1996 | Sakaki et al. ................... 524/17 |
| 5,672,639 | A | | 9/1997 | Corvasce et al. |
| 5,679,744 | A | | 10/1997 | Kawauzra et al. |
| 6,630,535 | B1 | | 10/2003 | Hogan et al. |
| 6,780,925 | B2 | * | 8/2004 | Materne et al. ............... 524/571 |
| 7,045,567 | B2 | | 5/2006 | Yagi et al. |
| 7,740,034 | B2 | | 6/2010 | Lukich et al. |
| 2003/0220437 | A1 | * | 11/2003 | Hopkins et al. ............... 524/492 |
| 2005/0027060 | A1 | * | 2/2005 | Yagi et al. ..................... 524/493 |
| 2005/0148723 | A1 | * | 7/2005 | Kondou ........................ 524/495 |
| 2005/0165137 | A1 | * | 7/2005 | Sivasithambaram Pillai et al. ............................... 524/15 |
| 2005/0205185 | A1 | * | 9/2005 | Reiter et al. ................... 152/504 |
| 2005/0223946 | A1 | * | 10/2005 | Korth et al. ................... 106/481 |
| 2005/0288408 | A1 | * | 12/2005 | Resendes et al. ............. 524/261 |
| 2006/0041036 | A1 | * | 2/2006 | Mohanty et al. .................. 524/9 |
| 2006/0293423 | A1 | * | 12/2006 | Resendes et al. ............. 524/155 |
| 2007/0161733 | A1 | * | 7/2007 | Hogan et al. .................. 524/432 |
| 2008/0090939 | A1 | * | 4/2008 | Netravali et al. ............. 523/124 |
| 2008/0242771 | A1 | * | 10/2008 | Kulbaba et al. ................ 524/68 |

OTHER PUBLICATIONS

The International Search Report; Mar. 14, 2008.
Nabil A.N. Alkadasi, Bhimrao D. Sarwade, D.G. Hundiwale, U.R. Kapadi; Studies on the Effect of Titanate Coupling Agent (2.0%) on the Mechanical Properties of Flyash-Filled Polybutadiene Rubber; Journal of Applied Polymer Science, vol. 93, 1293-1298 (2004) © 2004 Wiley Periodicals, Inc.
Making Nanotechnology Work With Titanates & Zirconates; Kenrich Petrochemicals, Inc.
Chenchy J. Lin, W.L. Hergenrother, E. Alexanian, G.G.A. Bohm; On the Filler Flocculation in Silica-Filled Rubbers Part I. Quantifying and Tracking the Filler Flocculation and Polymer-Filler Interactions in the Unvulcanized Rubber Compounds; *865 01-F-90 edit Jan. 7, 2003 1:43 PM p. 865; Bridgestone/Firestone Research, LLC Jan. 17, 2003.
Brochure of famas technology S.ar.l. entitled Selection Guide famasil Silane Coupling Agents.

* cited by examiner

*Primary Examiner* — Liam Heincer
(74) *Attorney, Agent, or Firm* — Emch, Schaffer, Schaub & Porcello Co., LPA

(57) ABSTRACT

A rubber composition has a base rubber, a filler which is a protein, including soy protein, derived from byproducts resulting from the manufacture of biodiesel fuel and a coupling agent.

2 Claims, No Drawings

METHOD AND FORMULATION FOR REINFORCING ELASTOMERS

CROSS REFERENCE TO RELATED APPLICATIONS

The present application is based upon and claims the benefit of U.S. provisional patent application No. 60/857,445 filed Nov. 7, 2006.

The present invention is directed to an effective, low cost method to reinforce elastomers using renewable resources. It is directed to reinforcing elastomers for tires using protein and, more specifically, protein containing materials derived from biodiesel byproducts, such as soy protein. The formulations include both protein and protein containing biomaterials along with a coupling agent such as a silane.

BACKGROUND OF THE INVENTION

Soy protein is a material which will become more available with the advent of biodiesel fuel manufactured using soy beans. For every pound of biodiesel produced using soy beans, there are several pounds of soy byproduct produced. If other seed oil, such as canola oil, is used to produce biodiesel, then there will also be protein containing byproducts from those processes as well. Most soy protein today is used in animal feed, but with the forecasts for biodiesel fuel, the animal feed market will be unable to absorb all of the protein containing byproducts.

As a result, there is potentially an abundance of low cost material available for filler applications. Very little has been done with protein in rubber composites. Protein rubber composites have been claimed in floor coverings (U.S. Pat. No. 2,056,958), in adhesives, bonding materials, coatings or impregnating agents (U.S. Pat. No. 2,127,298) and a milk derived protein was shown to give a four fold increase in the modulus of a natural rubber latex based product after being treated with an aldehyde (U.S. Pat. No. 2,931,845). The reinforcing effects of various soy proteins has been studied more recently in carboxylated SBR. See for example the following articles by L. Jong: "Characterization of soy protein/styrene-butadiene rubber composites," *Composites Magazine*, Part A 36 (2005), pages 675-682; and "Rubber composites reinforced by soy spent flakes", *Polymer International* 54, pages 1572-1580 (2005). Jong showed that soy protein isolate such as ADM's (Archer Daniels Midland, Decatur, Ill.) PRO-FAM®781 can be incorporated into a latex of carboxylated hot emulsion SBR. After coagulation and drying, the masterbatch was as effectively reinforced as a similar masterbatch using N-339 carbon black. Soy spent flakes (approximate composition of 12% cellulose, 17% pectin, 14% protein and 53% insoluble polysaccharide) could also effectively reinforce the same type of elastomer system. In neither of the above-reported studies did Jong use a non-functional elastomer or consider the use of a coupling agent.

SUMMARY OF THE INVENTION

The present invention is directed to a rubber composition/formulation which utilizes a protein, such as soy protein, and a coupling agent with the base rubber. As can be seen from the experimental data in the following examples, in order to obtain a rubber formulation having improved performance characteristics such as modulus, abrasion resistance, traction, handling and rolling resistance, it is desirable that a silane or other suitable coupling agent be used in conjunction with the soy protein.

The application describes how various forms of protein can be used to reinforce elastomers—specifically elastomers used in tires.

Dry soy protein is a rigid material with a shear elastic modulus of approximately 2 GPa. This makes it suitable as a candidate for rubber reinforcement. The soy protein contains functional groups such as carboxylic acids and substituted amine groups which may make coupling with known coupling agents, such as silanes, effective. Goodyear has successfully used silane coupling agents with interpenetrating networks of specific starches (which are biomaterials, but not protein) and polymers to give very low hysteresis fillers useful in tires as reported in the following patents: U.S. Pat. Nos. 5,374,671 and 5,672,639. The present invention is directed to the use of proteins, such as soy proteins, in combination with coupling agents, such as silane, to prepare reinforced rubber composites.

DETAILED DESCRIPTION OF THE INVENTION

The soy protein used in the rubber composition of the present invention could include the following produced by ADM:

| | | |
|---|---|---|
| PRO-FAM ® | H200 FG | Hydrolized Soy Protein |
| PRO-FAM ® | 646 | Isolated Soy Protein |
| PRO-FAM ® | 780 | Isolated Soy Protein |
| PRO-FAM ® | 782 | Isolated Soy Protein |
| PRO-FAM ® | 873 | Isolated Soy Protein |
| PRO-FAM ® | 880 | Isolated Soy Protein |
| PRO-FAM ® | 892 | Isolated Soy Protein |
| PRO-FAM ® | 922 | Isolated Soy Protein |
| PRO-FAM ® | 931 | Isolated Soy Protein |
| PRO-FAM ® | 937 | Isolated Soy Protein |
| PRO-FAM ® | 976 | Isolated Soy Protein |
| PRO-FAM ® | 981 | Isolated Soy Protein |
| PRO-FAM ® | 985 | Isolated Soy Protein |
| ARDEX ® F | Dispersable | Isolated Soy Protein |
| ARCON ® S | | Soy Protein Concentrate |
| ARCON ® SF | | Soy Protein Concentrate |
| ARCON ® SJ | | Soy Protein Concentrate |
| ARCON ® SM | | Soy Protein Concentrate |
| ARCON ® SP | | Soy Protein Concentrate |
| ARCON ® PLUS 412 | | Soy Protein Concentrate |

TVP® and Fortified TVP Textured Vegetable Protein 165 and 163 series.
SOYLEC® C15 and 220T Soy Flours
Toasted Soy Grits
Defatted Soy Grits The properties of such soy protein may be found in ADM publication "Protein Ingredients 2006-2007" which is incorporated herein by reference.

The soy protein should be ground to a size suitably small to be used as a filler. Silane coupling agents may include all conventional mono and difunctional coupling agents now used in the tire industry, along with silanes which are typically used to size glass. Examples thereof are bis(3-triethoxysilylpropyl)tetrasulfide (otherwise known as TESPT), .alpha-mercaptopropyltrimethoxysilane, 3-thiocyanatepropyltriethoxysilane, bis(3-triethoxysilylpropyl)disulfide (otherwise known as TESPD) and the like. Other coupling agents capable of reacting with both the protein and the elastomeric matrix would also be suitable for the invention.

Elastomers suitable for the use with proteins include all of the conventional elastomers such as solution SBR, emulsion SBR, styrene isoprene butadiene rubber (SIBR), polybutadiene, isoprene-butadiene rubber (IBR), butyl rubber, NBR, chloroprene rubber, EPDM, and combinations thereof. Functional rubbers with the same polymer backbone would also be suitable.

The protein containing material can be incorporated into the rubber by any conventional means, such as dry mixing or using a masterbatch. The masterbatch can be made by mixing the protein containing material into a latex (in the case of emulsion polymers) or a rubber dissolved in a solution (in the case of solution polymers such as SSBR or polybutadiene) followed by coagulation and drying. The coupling agent can be incorporated in the dry mix, as used in conventional silica mixing or could be used to treat an aqueous suspension of the protein containing filler prior to mixing into a latex or solution of rubber for the masterbatch.

An estimate of the percent of protein based filler, by weight, is 1-50 percent, with a preferable range of 1-30 percent and a most preferable range of 1-10 percent. For silane coupling agents, the range would be from 1-20 percent and the preferable range would be from 4-12 percent. Mixing protocols and temperatures would be those conventionally used with silica compounds (which are a function of the coupling agent).

Novel features of this invention include the use of protein containing materials in combination with suitable coupling agents as reinforcing agents for elastomers. The invention provides a low cost partial replacement of carbon black and/or silica.

Advantages include the fact that the protein containing filler is a renewable resource. Also, it is anticipated that the cost of the protein containing biofiller would be less than that of carbon black or silica.

Test results of various factors, formulations (with and without coupling agents) and particle size are set forth in the following examples:

Example #1

Evaluation of a silane coupling agent as a means of improving the physical properties of rubber compounds using bio-based material as filler. The silane coupling agent (Si-266/2, Degussa AG, Germany which is a disulfide) was used in the formulation set forth in the column entitled "Feature" but not in the formulation set forth in the column entitled "Reference." The material SBR 1712 was 100 parts of 23.5% styrene SBR and 37.5 parts oil.

| Base Recipe | | |
|---|---|---|
| Material | Reference | Feature |
| SBR 1712 | 137.5 | 137.5 |
| N339 - Carbon black | 40.0 | 40.0 |
| Soy Protein filler | 40.0 | 40.0 |
| ZnO | 3.0 | 3.0 |
| Stearic Acid | 1.0 | 1.0 |
| TMQ | 1.0 | 1.0 |
| 6PPD | 1.2 | 1.2 |
| DPPD | 0.8 | 0.8 |
| Wax | 1.5 | 1.5 |
| Aromatic Oil | 3.0 | 3.0 |
| Sulfur | 1.6 | 1.6 |
| TBBS | 1.6 | 1.6 |
| TMTD | 0.2 | 0.2 |
| Si-266/2 | — | 7.2 |
| Total | 232.4 | 239.6 |

Three types of protein based filler were evaluated, all from the Archer Daniels Midland Company: Baker's Soy Flour, Toasted Soy Flour, and Arcon VF Soy Protein Concentrate Mixing The reference compound was mixed using a conventional 2-pass procedure. The first pass consisted of all materials, except curatives (sulfur, TBBS and TMTD). The procedure is outlined below:

| First Pass | |
|---|---|
| Load polymer | 0:00 |
| Add oil | 1:00 |
| Add filler | 2:00 |
| Sweep ram | 3:00 |
| Dump | 5:00 (or 300° F.) |
| Second Pass | |
| Load rubber and curatives | 0:00 |
| Dump | 2:00 (or 230° F.) |

The feature compound was mixed in three passes, with the second pass as the silanization step. The procedure is outlined below:

| First Pass | |
|---|---|
| Load polymer | 0:00 |
| Add oil | 0:30 |
| Add filler[1] | 1:30 |
| Sweep ram | 2:30 (or 285° F.) |
| Dump | 4:30 (or 350° F.) |

[1]filler in this step was 100% of the protein-based filler and 25% of the carbon black

| Second Pass | |
|---|---|
| Load rubber | 0:00 |
| Add filler[2] and silane | 0:30 |
| Sweep ram | 1:30 |
| Sweep ram | 4:00 (or 285° F.) |
| Dump | 8:00 (temperature maintained between 290°-300° F.) |

[2]filler in this step was the remainder of the carbon black

| Third Pass | |
|---|---|
| Load rubber and curatives | 0:00 |
| Dump | 2:00 (or 230° F.) |

Testing

Testing conducted on the compounds is as follows:
Mooney Viscosity (ML 1+4 @ 212° F.)
Scorch (ts5 @ 275° F.)
MDR (380° F.×6', 340° F.×24', 325° F.×60')
Stress/Strain (cured 340° F.×15' and 22', original and aged 3d @ 212° F.)
Hot Tear (cured 340° F.×15', tested @ 240° F.)
DIN Abrasion (cured 340° F.×15')
Dynamic Properties (cured 340° F.×15'; tension test @ 10 Hz, −50° C. to +80° C.)
Key Test Results
300% Modulus The use of a silane coupling agent was able to significantly improve the compound modulus. Unaged data is shown below for the 340° F.×15' cure condition. Effects were similar at the 340° F.×22' cure condition as well as for the aged data of both cure conditions. Experimental values are shown in the tables, with the values in parenthesis representing these values normalized to the control,

| 300% Modulus (psi) | | | |
|---|---|---|---|
| Filler | w/out C.A.* | w/ C.A.* | % improvement |
| BSF | 389 (100) | 694 (178) | 78 |
| TSF | 403 (100) | 791 (196) | 96 |
| Arcon VF | 484 (100) | 943 (195) | 95 |

*CA is Coupling Agent here and elsewhere

DIN Abrasion

Abrasion resistance (relates to treadwear) as measured using the Zwick Abrasion tester was also significantly improved with the use of a silane coupling agent. Note: A lower value is considered better on this test.

| DIN Abrasion (mm³) | | | |
|---|---|---|---|
| Filler | w/out C.A. | w/C.A. | % improvement |
| BSF | 0.3221 (100) | 0.2514 (78) | 22 |
| TSF | 0.3077 (100) | 0.2417 (79) | 21 |
| Arcon VF | 0.2907 (100) | 0.2408 (83) | 17 |

Dynamic Properties

Dynamic properties are often used to predict tire performance in the areas of traction (E" @ 0° C.), handling (E* @ 55° C.), and rolling resistance (tangent delta @ 60° C.). The use of a silane coupling agent was able to improve the performance of the compound in each of these areas. Note: In the case of tangent delta @ 60° C., lower is better.

| | Filler | w/out C.A. | w/C.A. | % improvement |
|---|---|---|---|---|
| E" @ 0° C. (MPa) | BSF | 1.738 (100) | 1.911 (110) | 10 |
| | TSF | 1.997 (100) | 2.029 (102) | 2 |
| | Arcon VF | 1.827 (100) | 1.834 (100) | 0 |
| E* @ 55° C. (MPa) | BSF | 2.715 (100) | 3.479 (128) | 28 |
| | TSF | 3.053 (100) | 3.714 (122) | 22 |
| | Arcon VF | 3.038 (100) | 3.581 (118) | 18 |
| tan δ @ 60° C. | BSF | 0.184 (100) | 0.165 (90) | 10 |
| | TSF | 0.193 (100) | 0.161 (83) | 17 |
| | Arcon VF | 0.158 (100) | 0.150 (95) | 5 |

Summary

From the above test results it is clearly shown that the use of a silane coupling agent can be used to improve static and dynamic physical properties of rubber compounds using a variety of bio-based materials as filler.

Example #2

Evaluation of reduced particle size protein-based filler and various types of coupling agent as a means of further improving the properties of compounds using protein based material as filler.

Background

The particle size of the various soy materials evaluation in experiment #1 is on the order of 150 microns. The size range of carbon blacks typically used in tire compounds is 10-60 nm. It was felt that reducing the particle size of the soy material would further improve the compound properties. ADM provided samples of the Toasted Soy Flour ground to ~30 microns and ~10 microns which was felt to be practical limit for the material. Additionally, other types of coupling agent were evaluated at different levels, including Silquest A-189 (alpha-mercaptopropyl trimethoxysilane), dithiodipropionic acid (DTDPA), Ken-React® KR®44 (titanate coupling agent), and Ken-React® NZ®37 (zirconate coupling agent).

| Base Recipe | | |
|---|---|---|
| Material | Reference | Feature |
| SBR 1712 | 137.5 | 137.5 |
| N339 | 60.0 | 60.0 |
| Protein-based filler | 20.0 | 20.0 |
| ZnO | 3.0 | 3.0 |
| Stearic Acid | 1.0 | 1.0 |
| TMQ | 1.0 | 1.0 |
| 6PPD | 1.2 | 1.2 |
| DPPD | 0.8 | 0.8 |
| Wax | 1.5 | 1.5 |
| Aromatic Oil | 3.0 | 3.0 |
| Sulfur | 1.6 | 1.6 |
| TBBS | 1.6 | 1.6 |
| TMTD | 0.2 | 0.2 |
| Coupling Agent | — | See table |
| Total | 232.4 | |

| Coupling Agent Levels | | | |
|---|---|---|---|
| Coupling Agent (%)* | Low | Med. | High |
| Si-266 | 5.0 | 9.0 | 13.0 |
| A-189 | 5.0 | 9.0 | 13.0 |
| DTDPA | 5.0 | 9.0 | 13.0 |
| KR ® 44 | 1.4 | 2.0 | 4.0 |
| NZ ® 37 | 1.4 | 2.0 | 4.0 |

*based on amount of protein based filler

The coupling agent study was conducted using only the ~10 micron and ~30 microns samples of Toasted Soy Flour. Compounds with no coupling agent were mixed with all three sizes of the material.

Mixing

The reference compound, other compounds containing no coupling agent, and compounds containing the titanate or zirconate coupling agents were mixed using a conventional 2-pass procedure. The manufacturer of the titantate and zirconate materials claimed no special mixing procedures were required for those materials. The first pass consisted of all materials, except curatives (sulfur, TBBS and TMTD). The procedure is outlined below.

| First Pass | |
|---|---|
| Load polymer | 0:00 |
| Add filler | 1:00 |
| Add oil | 2:00 |
| Sweep ram | 3:00 |
| Dump | 5:00 (or 300° F.) |

| Second Pass | |
| --- | --- |
| Load rubber and curatives | 0:00 |
| Dump | 2:00 (or 230° F.) |

Compounds using the Si-266, A-189, and DTDPA coupling agents were mixed using a typical 3-pass mixing cycle similar to what would be used with silica compounds.

| First Pass | |
| --- | --- |
| Load polymer | 0:00 |
| Add filler[1] | 1:00 |
| Add oil | 2:00 |
| Sweep ram | 3:00 |
| Dump | 5:00 (or 300° F.) |

[1]filler in this step was 100% of the protein-based filler and 50% of the carbon black

| Second Pass | |
| --- | --- |
| Load rubber | 0:00 |
| Add filler[2] and silane | 0:30 |
| Sweep ram | 1:30 |
| Sweep ram | 4:00 (or 285° F.) |
| Dump | 8:00 (temperature maintained between 290°-300° F.) |

[2]filler in this step was the remainder of the carbon black

| Third Pass | |
| --- | --- |
| Load rubber and curatives | 0:00 |
| Dump | 2:00 (or 230° F.) |

Testing

Testing conducted on the compounds is as follows:

Mooney Viscosity (ML 1+4 @ 212° F.)

Scorch (ts5 @ 275° F.)

MDR (380° F.×6', 340° F.×24', 325° F.×60')

Stress/Strain (cured 340° F.×15' and 22', original and aged 3d @ 212° F.)

Hot Tear (cured 340° F.×15', tested @ 240° F.)

DIN Abrasion (cured 340° F.×15')

Dynamic Properties (cured 340° F.×15'; tension test @ 10 Hz, −50° C. to +80° C.)

Key Test Results—Experiment 2a

The following results will detail the comparison of the various particle sizes of the material. No coupling agent is used here. Results for the ~150 micron material are the average of two mixes of the same formulation, with the exception of DIN Abrasion which will be explained later.

300% Modulus

There was no significant difference in compound modulus associated with the different particle sizes of Toasted Soy Flour. Unaged data is shown below for the 340° F.×15' cure condition.

| 300% Modulus (psi) | | |
| --- | --- | --- |
| Filler | M300 | % change |
| ~150 | 700 (100) | — |
| ~30 | 663 (95) | (5) |
| ~10 | 688 (98) | (2) |

DIN Abrasion

Abrasion resistance (relates to treadwear) was measured using the Zwick Abrasion tester. The nature of the test prevents strong comparison of compounds tested at different times. Because the study for the ~30 micron material was run separate from the study using the ~10 micron material, those results cannot be directly compared, but each study did contain a compound using the ~150 micron material for comparison. No significant differences were noted.

| DIN Abrasion (mm$^3$) | | | |
| --- | --- | --- | --- |
| Filler | Vol. Loss | Vol. Loss | % change |
| ~150 | 0.1984 (100) | 0.2349 (100) | — |
| ~30 | 0.2048 (103) | — | 3 |
| ~10 | — | 0.2411 (103) | 3 |

Dynamic Properties

No significant differences were noted in the dynamic properties when comparing the results of the compound using different particle sizes of the same protein-based filler

| | Filler | | % change |
| --- | --- | --- | --- |
| E" @ 0° C. (MPa) | ~150 | 3.456 (100) | — |
| | ~30 | 3.327 (96) | (4) |
| | ~10 | 3.535 (102) | 2 |
| E* @ 55° C. (MPa) | ~150 | 3.280 (100) | — |
| | ~30 | 3.081 (94) | (6) |
| | ~10 | 3.143 (96) | (4) |
| tan δ @ 60° C. | ~150 | 0.240 (100) | — |
| | ~30 | 0.258 (108) | 8 |
| | ~10 | 0.243 (101) | 1 |

Summary

From these results, it can clearly be seen that for particle sizes ranging from 10-150 microns, there is no significant difference obtained in compound properties.

Key Test Results—Experiment 2b

The following results will detail the evaluation of the various coupling agents at different levels. Because the results obtained with the ~30 micron and ~10 micron materials were similar, only data from the ~10 micron material will be shown here.

300% Modulus (psi)

Unaged data is shown below for the 340° F.×15' cure condition. A notable trend in modulus is seen with the Si-266 and A-189 coupling agents whereby modulus increased as more coupling agent is used. A-189 has a stronger impact than Si-266. The effect of DTDPA is questionable, and no effect is seen with the titanate or zirconate materials.

| 300% Modulus (psi) | | | | |
|---|---|---|---|---|
| Coupling Agent | None | Low | Med. | High |
| None | 688 | | | |
| Si-266 | | 799 | 899 | 943 |
| A-189 | | 826 | 991 | 1120 |
| DTDPA | | 772 | 847 | 777 |
| KR ® 44 | | 669 | 696 | 671 |
| NZ ® 37 | | 699 | 775 | 711 |

DIN Abrasion

Abrasion resistance (relates to treadwear) was measured using the Zwick Abrasion tester. Notable trends are again seen with the Si-266 and A-189 materials, with A-189 being better, but no significant effect is noted with the other coupling agents.

| DIN Abrasion (mm$^3$) | | | | |
|---|---|---|---|---|
| Coupling Agent | None | Low | Med. | High |
| None | 0.2411 | | | |
| Si-266 | | 0.2409 | 0.2273 | 0.2261 |
| A-189 | | 0.2127 | 0.2085 | 0.2028 |
| DTDPA | | 0.2309 | 0.2306 | 0.2357 |
| KR ® 44 | | 0.2421 | 0.2336 | 0.2490 |
| NZ ® 37 | | 0.2356 | 0.2457 | 0.2284 |

Dynamic Properties

The Si-266 coupling agent provides improvement in both E" @ 0° C. and E* @ 55° C. The results for the DTDPA show perhaps there is an optimum level. A-189, the titanate, and zirconate coupling agents show no benefits to dynamic properties at the levels tested.

| E" @ 0° C. (MPa) | | | | |
|---|---|---|---|---|
| Coupling Agent | None | Low | Med. | High |
| None | 3.535 | | | |
| Si-266 | | 3.516 | 3.907 | 4.307 |
| A-189 | | 3.083 | 3.064 | 2.713 |
| DTDPA | | 3.554 | 4.354 | 3.931 |
| KR ® 44 | | 3.282 | 3.575 | 3.199 |
| NZ ® 37 | | 3.535 | 3.432 | 3.338 |

| E* @ 55° C. (MPa) | | | | |
|---|---|---|---|---|
| Coupling Agent | None | Low | Med. | High |
| None | 3.143 | | | |
| Si-266 | | 3.300 | 3.701 | 3.979 |
| A-189 | | 3.228 | 3.349 | 3.385 |
| DTDPA | | 3.472 | 3.961 | 3.740 |
| KR ® 44 | | 3.199 | 3.352 | 3.222 |
| NZ ® 37 | | 3.515 | 3.522 | 3.360 |

| tan δ @ 60° C. | | | | |
|---|---|---|---|---|
| Coupling Agent | None | Low | Med. | High |
| None | 0.243 | | | |
| Si-266 | | 0.246 | 0.242 | 0.236 |
| A-189 | | 0.227 | 0.218 | 0.220 |
| DTDPA | | 0.257 | 0.254 | 0.258 |
| KR ® 44 | | 0.263 | 0.260 | 0.257 |
| NZ ® 37 | | 0.259 | 0.259 | 0.258 |

Summary

From these results, it can be seen that certain coupling agents can impact physical properties, while others necessarily do not. The best overall balance of properties was obtained with the original silane coupling agent, namely bis(3-triethoxysilylpropyl)disulfide or Si-266 (TESPD). Other silane coupling agents which may be used include bis(3-triethoxysilylpropyl)tetrasulfide (otherwise known as TESPT), .alpha-mercaptopropyltrimethoxysilane, 3-thiocyanatepropyltriethoxysilane.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. In a method of formulating a rubber composition for tires the improvement comprising reacting a filler of soy protein containing material with a silane coupling agent during in situ mixing of a batch of non-functionalized base rubber, said non-functionalized base rubber being a non-functionalized member selected from the group consisting of natural rubber, styrene butadiene rubber (SBR), nitrile butadiene rubber (NBR), polybutadiene, ethylene-propylenediene monomer rubber (EPDM), styrene isoprene butadiene rubber (SIBR), isoprene butadiene rubber (IBR) and combinations thereof.

2. The method according to claim 1 further including the step of curing said batch.

\* \* \* \* \*